(12) United States Patent
Miska et al.

(10) Patent No.: US 12,540,794 B2
(45) Date of Patent: Feb. 3, 2026

(54) AUTOMATED VISION-BASED ORIENTATION MEASUREMENT SYSTEM AND METHOD OF USE

(71) Applicant: BAE Systems Information and Electronic Systems Integration Inc., Nashua, NH (US)

(72) Inventors: Jacob W. Miska, Nashua, NH (US); Gregory S. Notaro, Bedford, NH (US); Scott J. Adams, Groton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 42 days.

(21) Appl. No.: 18/582,999

(22) Filed: Feb. 21, 2024

(65) Prior Publication Data

US 2025/0264303 A1    Aug. 21, 2025

(51) Int. Cl.
| | |
|---|---|
| F41G 7/00 | (2006.01) |
| B64D 45/00 | (2006.01) |
| G06T 7/73 | (2017.01) |
| H04N 23/56 | (2023.01) |

(52) U.S. Cl.
CPC ............ *F41G 7/001* (2013.01); *B64D 45/00* (2013.01); *F41G 7/007* (2013.01); *G06T 7/73* (2017.01); *H04N 23/56* (2023.01); *G06T 2207/30204* (2013.01); *G06T 2207/30252* (2013.01)

(58) Field of Classification Search
CPC ......... F41G 7/001; F41G 7/007; B64D 45/00; G06T 7/73; G06T 2207/30204; G06T 2207/30252; H04N 23/56

USPC ......................................................... 701/33.1
See application file for complete search history.

(56) References Cited

U.S. PATENT DOCUMENTS

| | | | | |
|---|---|---|---|---|
| 4,978,221 | A * | 12/1990 | Sepp ......................... | G01S 7/48 356/28 |
| 2017/0321994 | A1 * | 11/2017 | Mallon ..................... | F41G 7/26 |
| 2018/0245896 | A1 * | 8/2018 | Burczynski ............. | F42B 12/34 |
| 2021/0134079 | A1 * | 5/2021 | Nee ......................... | B65G 47/80 |

(Continued)

FOREIGN PATENT DOCUMENTS

WO    2023/073258 A1    5/2023

OTHER PUBLICATIONS

International Search Report, PCT/US25/16395, mailed Apr. 10, 2025, 12 pages.

*Primary Examiner* — Tyler D Paige
(74) *Attorney, Agent, or Firm* — Sand, Sebolt & Wernow LPA; Gary McFaline

(57) ABSTRACT

A calibration assembly for a guided vehicle. The calibration assembly includes an orientation marker that operably engages with a first guidance apparatus of the guided vehicle. The calibration assembly also includes an imaging assembly that operably engages with and is in electrical communication with a second guidance apparatus of the guided vehicle. When the imaging assembly captures the orientation marker at a translated position for at least one cycle, the imaging assembly calibrates a rotational displacement between a first guidance direction of the first guidance apparatus and a second guidance direction of the second guidance apparatus based on an angular displacement of the orientation marker measured between a zeroed position denoting the first guidance direction and the translated position.

17 Claims, 8 Drawing Sheets

(56) References Cited

U.S. PATENT DOCUMENTS

| | | | |
|---|---|---|---|
| 2022/0163634 A1* | 5/2022 | Gorman | G01S 7/4816 |
| 2022/0292718 A1 | 9/2022 | Mendonca et al. | |
| 2023/0228601 A1 | 7/2023 | Lau et al. | |
| 2024/0163560 A1* | 5/2024 | Zhou | G01B 11/03 |
| 2025/0076014 A1* | 3/2025 | Minguy | F41G 7/007 |
| 2025/0132122 A1* | 4/2025 | Haartsen | H01J 37/21 |

* cited by examiner

AUTOMATED VISION-BASED ORIENTATION MEASUREMENT SYSTEM AND METHOD OF USE

TECHNICAL FIELD

The present disclosure generally relates to an automated calibration assembly for calibrating two guidance orientations of two guidance kits of a projectile with one another.

BACKGROUND ART

In military operations, modern projectiles or ballistic devices being launched from various platforms, including mobile and stationary vehicles, may be equipped with at least one guidance kit for guiding the projectile to a desired target or point of interest. In some instances, guided projectiles may be equipped with various types of guidance systems and/or kits for detecting and identifying various targets or points of interest that are airborne, waterborne, and grounded dependent upon the mission and/or military operation at hand. In one instance, a guided projectile may be equipped with a first guidance kit type and a second guidance kit type that are distinguishable from one another based on the mission and/or military operation at hand. In another instance, another guided projectile may be equipped with a first guidance kit type and a second guidance kit type that are similar to one another to enhance a specific guidance system based on the mission and/or military operation at hand.

In these instances, however, the first guidance kit type and the second guidance kit type provided on a projectile may be rotationally displaced and/or angularly offset from one another due to various issues, including inconsistent threading between the guidance kits. With such issues, misaligned and/or displaced guidance directions between a first guidance kit type and a second guidance kit type may result in inconsistent guidance operations being independently performed by the first guidance kit type and the second guidance kit. If such issues are present, operators and/or technicians that assembly these projectiles must be conscious of the rotational positioning of the first guidance kit type and the second guidance kit. If, however, structural configurations are inconsistent, like threading and other mechanical connections provided on these projectiles, operators and technicians may be unable to correctly assemble the projectile without having a small amount of rotational misalignment between the first guidance kit type and the second guidance kit.

SUMMARY OF THE INVENTION

In one aspect, an exemplary embodiment of the present disclosure may provide a calibration assembly for a guided vehicle. The calibration assembly includes an orientation marker that operably engages with a first guidance apparatus of the guided vehicle. The calibration assembly also includes an imaging assembly that operably engages with and in electrical communication with a second guidance apparatus of the guided vehicle. When the imaging assembly captures the orientation marker at a translated position for at least one cycle, the imaging assembly calibrates a rotational displacement between a first guidance direction of the first guidance apparatus and a second guidance direction of the second guidance apparatus based on an angular displacement of the orientation marker measured between a zeroed position denoting the first guidance direction and the translated position.

This exemplary embodiment or another exemplary embodiment may further include that the imaging assembly comprises: an imaging device operably engaged with the second guidance apparatus of the guided vehicle and faces the orientation marker; a processor operatively connected with the imaging device; and a calibration program executable by the processor, wherein the calibration program includes the zeroed position of the orientation marker; wherein when the imaging device captures the orientation marker at the translated position for the at least one cycle in response to the processor executing the calibration program, the processor calibrates the rotational displacement between the first guidance direction of the first guidance apparatus and the second guidance direction of the second guidance apparatus based on the angular displacement of the orientation marker measured between the zeroed position and the translated position. This exemplary embodiment or another exemplary embodiment may further include that the imaging assembly further comprises: at least one illumination device operably engaged with the processor and facing towards the orientation marker; wherein the at least one illumination device is configured to illuminate at least a portion of the orientation marker prior to the imaging device viewing the orientation marker. This exemplary embodiment or another exemplary embodiment may further include that the orientation marker comprises: a geometric shape of the orientation marker denoting the first guidance direction at the zeroed position; wherein the calibration assembly is configured to calibrate the second guidance apparatus with the first guidance apparatus based on the angular displacement between a second geometric shape of the translated position and the geometric shape of the zeroed position. This exemplary embodiment or another exemplary embodiment may further include at least one illumination device operably engaged with the orientation marker and facing towards the imaging device; wherein the at least one illumination device is configured to illuminate the orientation marker from the first guidance apparatus and remote from the imaging device. This exemplary embodiment or another exemplary embodiment may further include that the orientation marker comprises: a computer readable medium facing at the imaging assembly; wherein the computer readable is configured to store data about the first guidance apparatus. This exemplary embodiment or another exemplary embodiment may further include that the orientation marker is made of a retro-reflective material. This exemplary embodiment or another exemplary embodiment may further include that the imaging device is a visible light camera equipped with macro lens.

In another aspect, an exemplary embodiment of the present disclosure may provide a method. The method includes steps of: installing an orientation marker with a first guidance apparatus of a guidance kit, wherein the first guidance apparatus defines a first guidance direction; installing an imaging assembly with a second guidance apparatus of the guidance kit, wherein the second guidance apparatus defines a second guidance direction independent of the first guidance direction; and loading a computer program product for calibration of the guidance kit on a computer readable medium of the imaging assembly that is executable by a processor of the imaging assembly which, when executed by the processor, causes the processor to: command an imaging device of the imaging assembly to analyze at least one image of the orientation marker, wherein the orientation marker is provided at a translated position; receive the at least one image from the imaging device; measure an angular displacement of the orientation marker between a zeroed position stored on the computer readable medium and the translated position; and calibrate a rotational displacement between the first guidance direction of the first guidance apparatus and the second guidance direction of the second guidance apparatus.

This exemplary embodiment or another exemplary embodiment may further include that when the computer program product is executed by the processor, the processor is further caused to: command an illumination device of the imaging assembly to illuminate at least a portion of the orientation marker prior to the imaging device capturing the at least one image of the orientation marker. This exemplary embodiment or another exemplary embodiment may further include a step of installing a computer readable medium on the orientation marker to store data about the first guidance apparatus; and wherein when the computer program product is executed by the processor, the processor is further caused to: analyze the data stored in the computer readable medium to acquire knowledge of the first guidance apparatus. This exemplary embodiment or another exemplary embodiment may further include that the orientation marker is formed of retro-reflective material. This exemplary embodiment or another exemplary embodiment may further include that when the computer program product is executed by the processor, the processor is further caused to: command an illumination device to illuminate the orientation marker from the first guidance apparatus prior to the imaging device capturing the at least one image of the orientation marker. This exemplary embodiment or another exemplary embodiment may further include that the imaging device is a visible light camera equipped with macro lens.

In yet another aspect, an exemplary embodiment of the present disclosure may provide a computer-implemented method stored on a computer readable medium of a calibration assembly and executable by a processor of the calibration assembly on a guided vehicle. The computer-implemented method includes: executing, by the processor, a first instruction to command an imaging device of the calibration assembly to capture at least one image of an orientation marker, wherein the orientation marker is provided at a translated position; executing, by the processor, a second instruction to receive the at least one image from the imaging device; executing, by the processor, a third instruction to measure an angular displacement of the orientation marker between a zeroed position stored on the computer readable medium and the translated position; and executing, by the processor, a fourth instruction to calibrate a rotational displacement between a first guidance direction of a first guidance apparatus and a second guidance direction of a second guidance apparatus.

This exemplary embodiment or another exemplary embodiment may further include executing, by the processor, a fifth instruction to command an illumination device of the calibration assembly to illuminate at least a portion of the orientation marker prior to the imaging device capturing the at least one image of the orientation marker. This exemplary embodiment or another exemplary embodiment may further include executing, by the processor, a fifth instruction to analyze data stored in a computer readable medium of the orientation marker about the first guidance apparatus. This exemplary embodiment or another exemplary embodiment may further include that the second instruction of receiving the at least one image from the imaging device further includes that the orientation marker reflects light emitted by the imaging device back to the imaging device based on the orientation marker being formed of a retro-reflective material.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
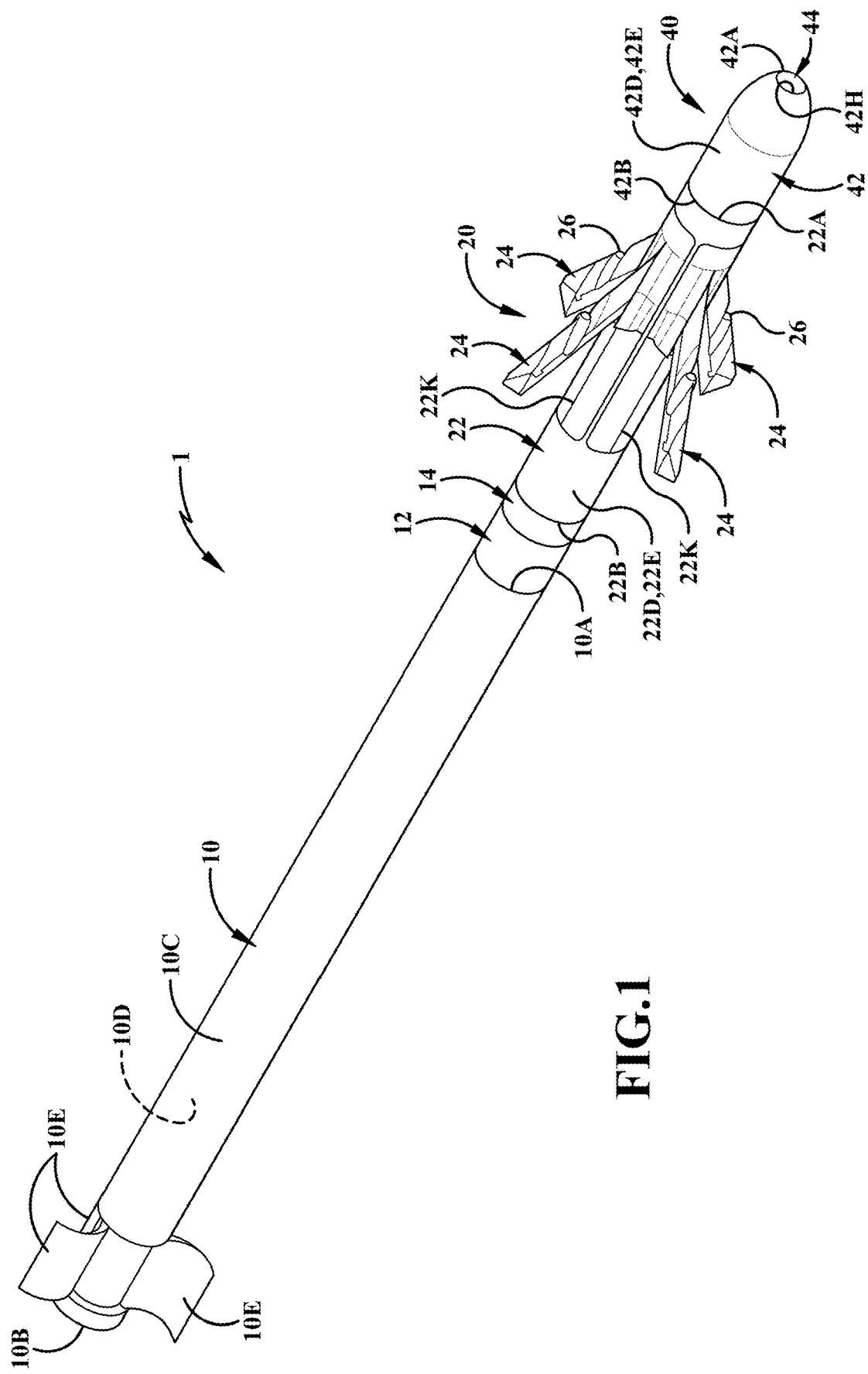
FIG. 1 illustrates a front, top, first side isometric perspective view of a guided projectile in accordance with one aspect of the present disclosure, wherein the guided projectile is equipped with a first guidance kit, a second guidance kit, and an automated calibration assembly.

FIG. 1 illustrates a projectile, ballistic device, or guided vehicle 1 that may be equipped with a guidance kit for guiding the illustrated projectile 1 to a specific target. As provided herein, the illustrated projectile 1 is a Hydra 70 rocket equipped at least two guidance kits for guiding the illustrated projectile 1 to a specific target, which are discussed in greater detail below. It should be understood that projectile 1 may be any type of moveable device regardless of whether it is a munition. For example, the projectile 1 could also be any manned or unmanned object that needs guidance in the manner discussed herein. Such use and purpose of the at least two guidance kits with the illustrated projectile 1 are described in more detail below.

In the present disclosure, projectile 1 is configured to be launched from a ground-based or ground-vehicle platform towards a desired airborne or ground-based target. It will be understood that the platform discussed herein is exemplary only and any type of platform is contemplated to be represented. In one exemplary embodiment, the platform described herein may be represented as an aircraft or air vehicle (e.g., fixed-wing aircraft or rotary-wing aircraft that is manned or unmanned) that is capable of launching projectiles and other similar payloads from air and striking targets in air, on land, or at sea. In another exemplary embodiment, the platform described herein may be represented as hand-held launcher, a launcher fixed to a ground transporting vehicle, a launcher fixed to a naval vehicle, or other suitable launchers for launching projectiles and other similar devices from land or sea and striking targets on land or sea. In another exemplary embodiment, the platform described herein may be a ground launch vehicle that is operably engaged with a ground surface and is configured to launch surface-to-surface projectiles or missiles (or "SSM"), ground-to-ground projectiles or missiles (or "GGM"), or surface-to-air projectiles or missiles. Stated differently, the exemplary platform is capable of launching projectiles and other similar devices from land and striking targets in the air or on land or sea. In another exemplary embodiment, the platform described herein may be represented as watercraft, vessel, or water vehicle (manned or unmanned) that is capable of launching projectiles and other similar payloads from the water to strike targets in air, on land, or at sea or through the water to strike targets in the sea.

The projectile 1 may include a rocket motor or engine 10 configured to provide suitable propulsion and thrust needed for a desired military operation. The rocket motor 10 generally includes a first or front end 10A, a second or rear end 10B opposite to the first end 10A, and a longitudinal axis defined therebetween. The rocket motor 10 also generally includes a cylindrical wall 10C that extends between the first end 10A and the second end 10B along the longitudinal axis of the rocket motor 10. While not illustrated herein, suitable rocket propellants and elements may be stored inside of the cylindrical wall 10C (e.g., a chamber 10D defined inside of the cylindrical wall 10C) that generate propulsion and thrust for the rocket motor 10. The rocket motor 10 also includes an aft fin member 10E operably engaged with the cylindrical wall 10C proximate to the second end 10B of the rocket motor 10. The aft fin member 10E may provide flight assistance to the projectile 1 at the second end 10B of the rocket motor 10 as the projectile 1 travels through the air between the initial launch at the platform 2 and a desired target.

Projectile 1 also includes a warhead 12 with an impact-detonating fuse 14. As best seen in FIG. 1, the combination of the warhead 12 and impact and proximity detonating fuse 14 threadably engage with the first end 10A of rocket motor 10. As such, the combination of the warhead 12 and impact-detonating fuse 14 are positioned ahead of and/or forward of the rocket motor 10. While the combination of the warhead 12 and impact-detonating fuse 14 are positioned ahead of and/or forward of the rocket motor 10, a combination of a warhead and an impact-detonating fuse may be positioned at any suitable position along a projectile described and illustrated herein. In one exemplary embodiment, a combination of a warhead and an impact-detonating fuse may be positioned between a seeker device described and illustrated herein and a guidance device such that the guidance device, the combination of the warhead and the impact-detonating fuse, and the seeker device may be a unitary, monolithic device that is assembled in a projectile. In another exemplary embodiment, a warhead may include a center shaft that allows for opposing ends of the warhead to be visible through said center shaft. Such inclusion of a center shaft may direct light from one end of the warhead (e.g., light that is generated by illumination devices discussed herein) to an opposing end of the warhead so that an image sensor (as discussed herein) disposed at the opposing end may measure varying degrees and/or orientation of the light to calibrate at least two guidance apparatuses and/or kits with one another.

Projectile 1 may also include a thermal battery or power source. In operation, the thermal battery may provide a desired amount of power to any electrical devices and/or assemblies included in projectile 1 that are described and illustrated herein once projectile 1 is in flight.

In the illustrated embodiment, the rocket motor 10 of the projectile 1 may be a standard 2.75-inch rocket motor (e.g., liquid-fueled rocket motors, solid-fueled rocket motors, or other suitable rocket motors of the like). In other exemplary embodiments, any suitable rocket motor may be equipped for a projectile based on the mission and/or objective.

Projectile 1 also includes a first guidance kit or apparatus (hereinafter "first guidance kit") generally referred to as 20 that is configured to guide the projectile 1 to a specific target. The first guidance kit 20 may include legacy hardware and guidance programs that are configured to initiate and/or deploy on-board devices to guide and/or direct the projectile 1 to a specific target. The first guidance kit 20 is also configured to operably engage a rocket motor, such as rocket motor 10, to enable guidance capabilities to the rocket motor. As described above, the first guidance kit 20 provided with the projectile 1 is a legacy guidance kit and/or apparatus. In one example, the legacy guidance kit described and illustrated herein may be an Advanced Precision Kill Weapon System (APKWS) laser guidance kit manufactured by BAE Systems. In another example, the legacy guidance kit described and illustrated herein may be a preexisting or legacy guidance kit that includes commercially-available navigation equipment and/or instruments, including inertial navigation systems or inertial measurement units, for guiding and steering a projectile to a desired target. In yet another example, the guidance kit described and illustrated herein may be a guidance kit that includes non-commercially-available navigation equipment and/or instruments, including inertial navigation systems or inertial measurement units, for guiding and steering a projectile to a desired target With respect to first guidance kit 20, first guidance kit 20 includes a first body 22 that operably engages with the rocket motor 10 and houses the electrical components and/or device of first guidance kit 20. The first body 22 includes a first or front end 22A positioned away from the rocket motor 10, a second end 22B opposite to the first end 22A and operably engages with the rocket motor 10 at the first end 10A of the rocket motor 10, and a longitudinal axis 22C defined therebetween.

The first body 22 also includes a cylindrical wall 22D that extends between the first end 22A and the second end 22B. The cylindrical wall 22D of the first body 22 may also be configured to house devices and components of the first guidance kit 20 and other guidance devices discussed in greater detail below. The cylindrical wall 22D of the first body 22 may also define an exterior surface 22E that extends longitudinally between the first end 22A and the second end 22B and faces the exterior environment surrounding the projectile 1. The cylindrical wall 22D also defines an interior surface 22F that extends longitudinally between the first end 22A and the second end 22B and faces into the first body 22 in an opposite direction relative to the exterior surface 22E.

The first body 22 also defines a chamber 22G inside of the cylindrical wall 22D between the first end 22A and the second end 22B. The chamber 22G is also accessible at a fore or front opening 22H defined at the first end 22A of the first body 22. Such devices and components of the first guidance kit 20 may be inserted through the front opening 22H for storing and/or housing said devices and components of the first guidance kit 20. The first body 22 also defines internal threads 22J that extend inwardly into the cylindrical wall 22D from the interior surface 22F towards the exterior surface 22E. Such use and purpose of the internal threads 22J are discussed in greater detail below.

Figure 2:
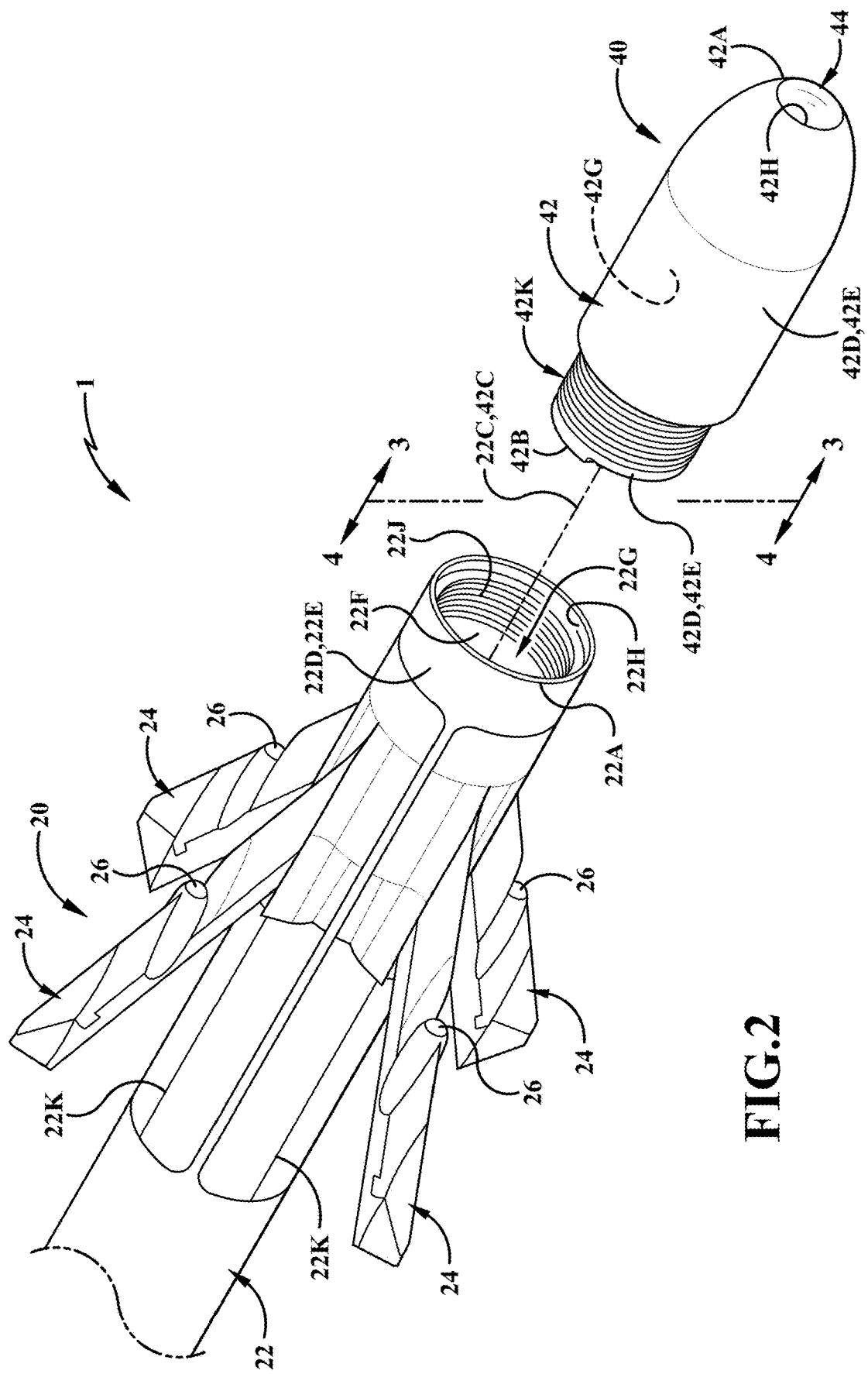
FIG. 2 illustrates a partial exploded view of the first guidance kit and the second guidance kit.

The first body 22 also defines a set of slots 22K. As best seen in FIG. 2, the set of slots 22K is defined in the cylindrical wall 22D such that each slot of the set of slots 22K extends into the cylindrical wall 22D from the exterior surface 22E to the interior surface 22F. Each slot of the set of slots 22K also extends longitudinally between the first end 22A and the second end 22B of the first body 22. Such use and purpose of the set of slots 22K is discussed in greater detail below.

The first guidance kit 20 may also include a set of flaperons and wings 24 that operably engages with the first body 22. As best seen in FIG. 1, each wing of the set of wings 24 is moveable on the first body 22 proximate to the first end 22A of the first body 22. More particularly, the set of wings 24 is pivotable outwardly from the first body 22 and outside of the set of slots 22K when the projectile 1 is launched and travels through the air. In one exemplary embodiment, each wing of a set of wings discussed herein may be fixed and remain stationary with a body of a first guidance kit such that each wing of the set of wings is free from moving relative to the body of the first guidance kit.

First guidance kit 20 may also include a set of optical imaging devices or seekers 26. As best seen in FIG. 2, each optical imaging device of the set of optical imaging device 26 operably engages with a corresponding wing of the set of wings 24. In the present disclosure, a portion of each optical imaging device of the set of optical imaging devices 26 is visible to the external environment and/or far field forward of the projectile 1. During operation, each optical imaging device of the set of optical imaging devices 26 is configured to visualize and detect one or more electromagnetic wavelengths (e.g., visible light or visible spectrum wavelengths, infrared wavelengths, ultraviolet wavelengths, etc.) of desired targets, particularly aircrafts and air vehicles in flight. In one instance, each optical imaging device of the set of optical imaging devices 26 may be a laser-based guidance device and/or sensor that is led by a laser device to a desired target or point-of-interest. In this instance, these optical imaging devices may also be equipped with Avalanche Photodiodes to detect laser response off of designated targets.

Figure 5:
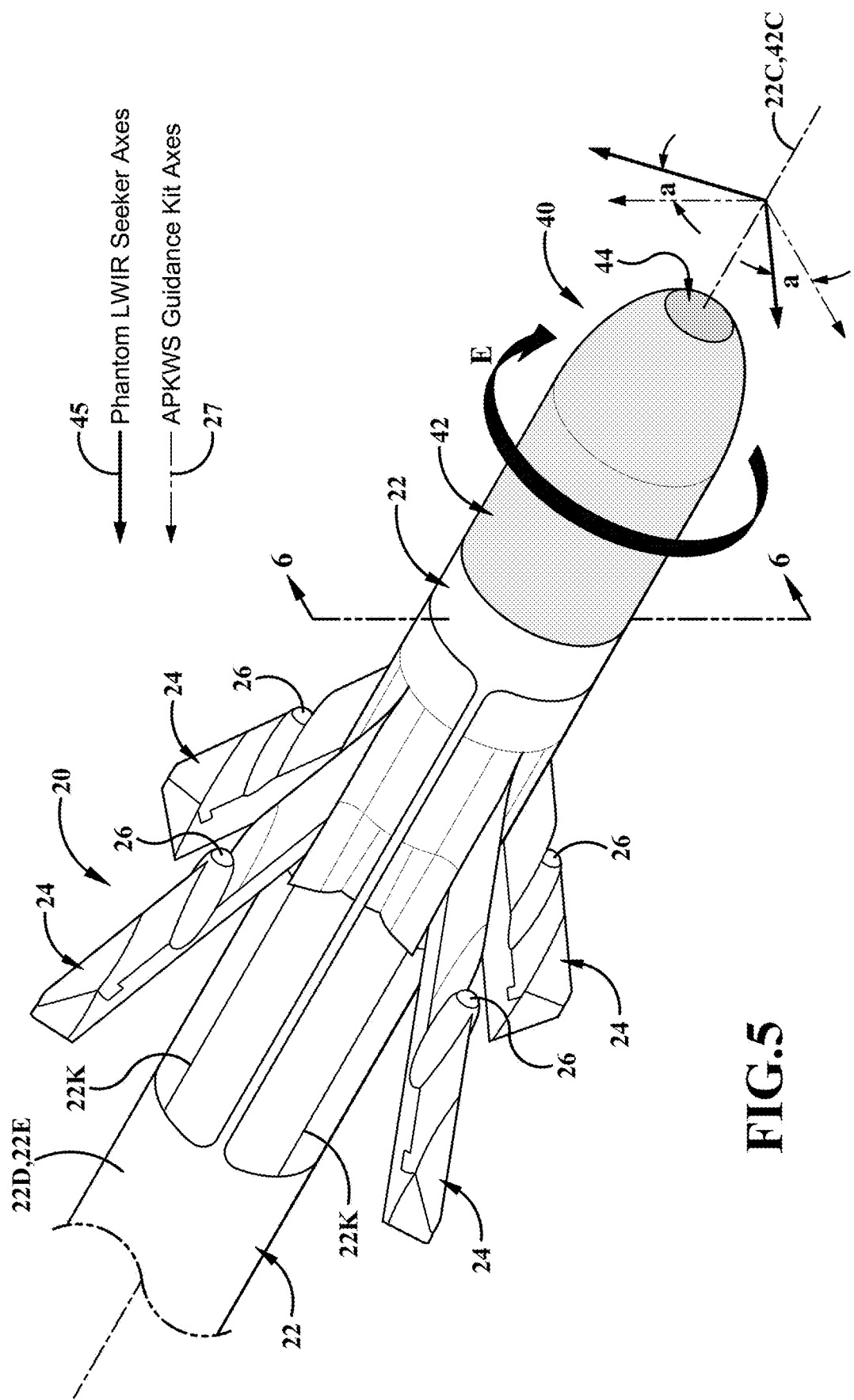
FIG. 5 is an operational view of the second guidance kit being threadably engaged with the first guidance kit, wherein a first guidance direction of the first guidance kit and a second guidance direction of the second guidance kit are offset from one another.
Figure 7:
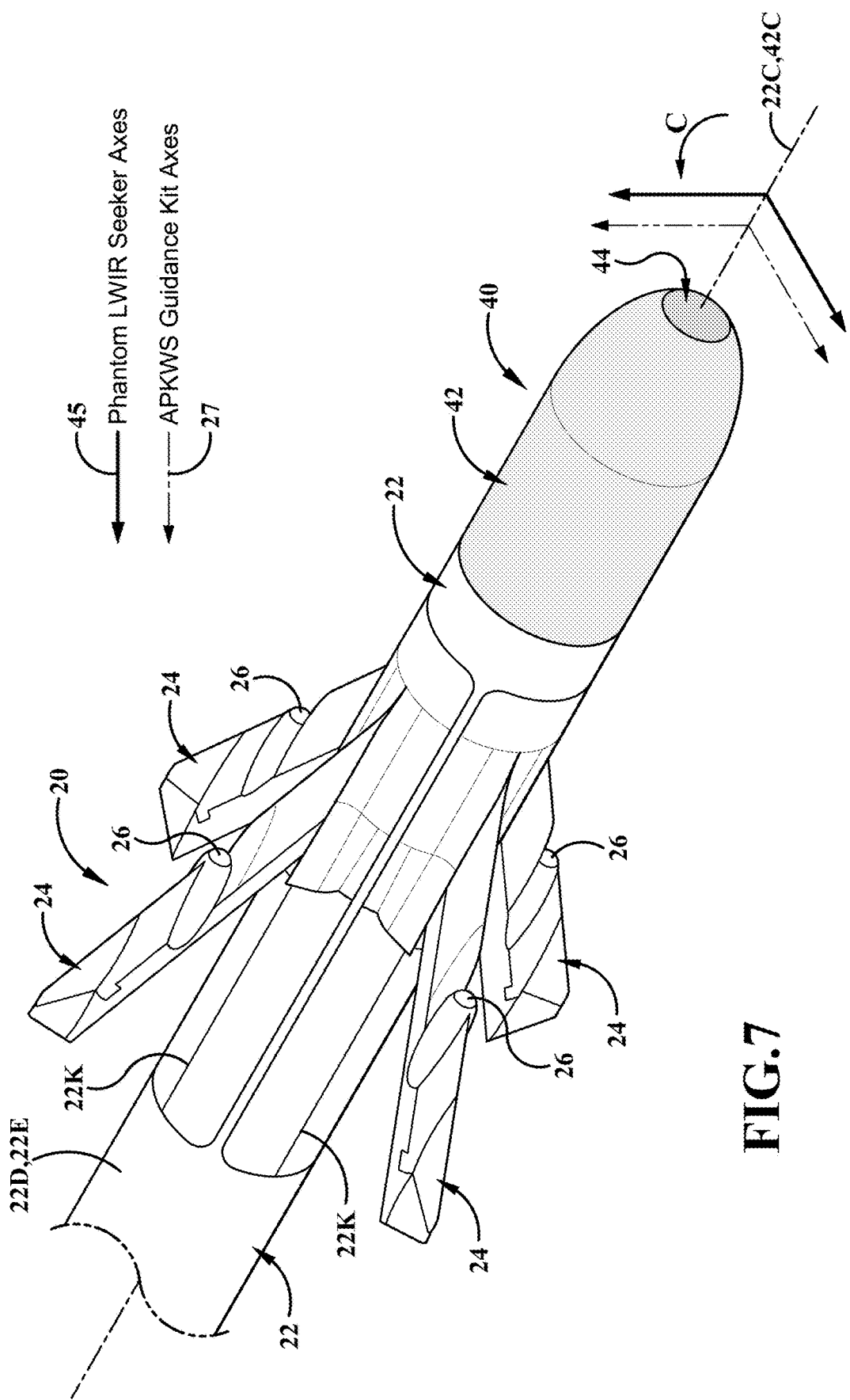
FIG. 7 is another operational view similar to FIG. 6, but the calibration assembly automatically calibrates the second guidance direction of the second guidance kit with the first guidance direction of the first guidance kit such that the first guidance direction and the second guidance direction are parallel with one another.

First guidance kit 20 also includes a first guidance direction generally referred to as 27. As best seen in FIGS. 5 and 7, the first guidance direction 27 is denoted by a pair of arrows extending outwardly from the longitudinal axis 22C of the first body 22. In the present disclosure, the first guidance direction 27 is also provided at a first orientation or angular position relative to the longitudinal axis 22C of the first body 22. It should be understood that the first guidance direction 27 represents the directional guidance of the first guidance kit 20 for guiding the projectile 1 to a desired target and/or location based on the data and information detected and/or viewed by the set of optical imaging devices 26.

Figure 4:
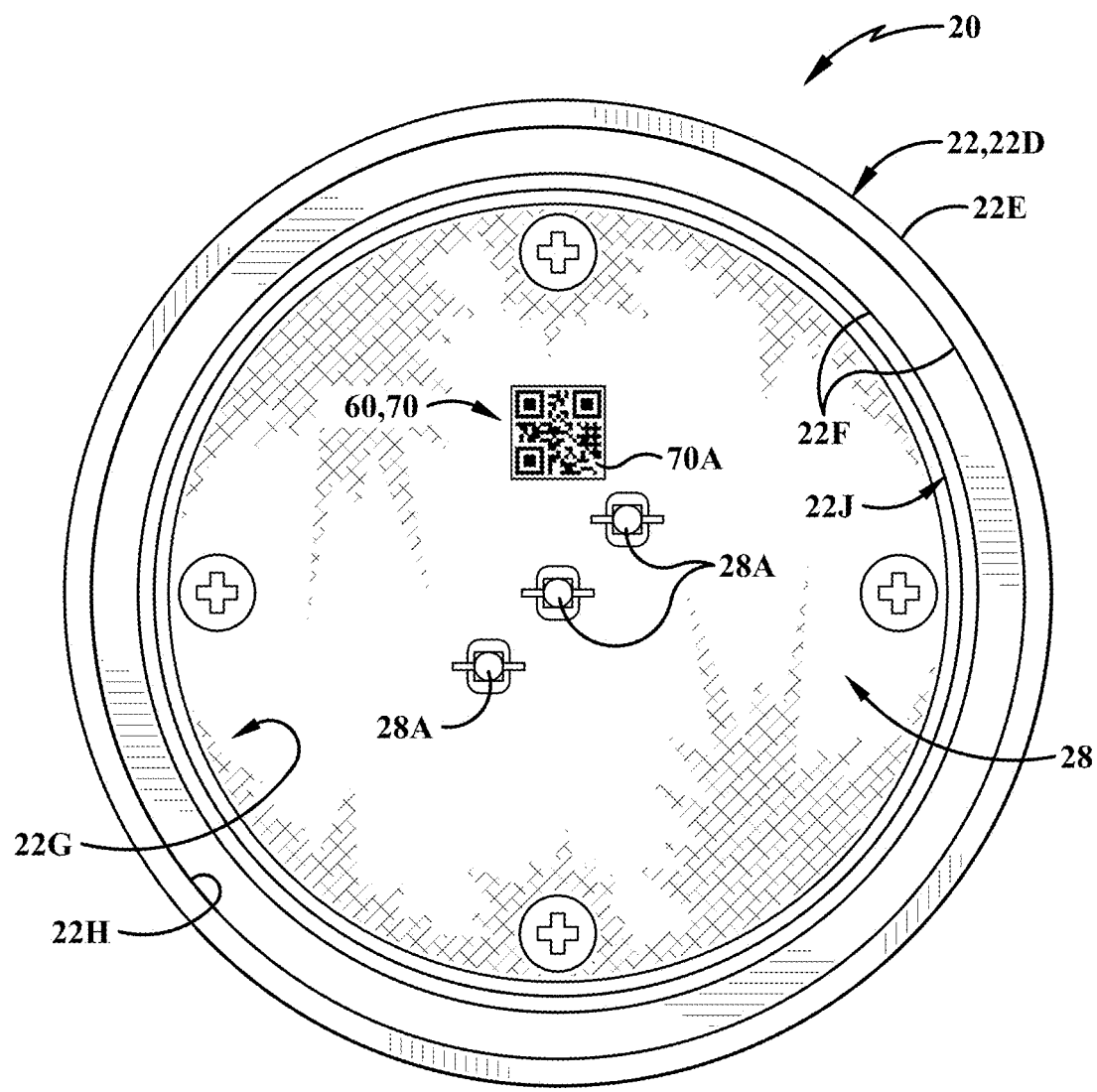
FIG. 4 is a front elevation view of the first guidance kit taken in the direction of line 4-4 shown in FIG. 2.

First guidance kit 20 also includes a first two-way communication board 28. As best seen in FIG. 4, the first two-way communication board 28 is housed inside of the chamber 22G of the first body 22 and is accessible at the front opening 22H. The first two-way communication board 28 may also include a set of sensors or communication lights 28A that electrically connect with and operably engaged with the first two-way communication board 28 for communicating with another guidance kit of the projectile 1, which is discussed in greater detail below.

Projectile 1 also includes a second guidance kit or apparatus (hereinafter "second guidance kit") generally referred to as 40 that is configured to guide the projectile 1 to a specific target. The second guidance kit 40 may include available hardware and protocols that are configured to initiate and/or deploy on-board devices to guide and/or direct the projectile 1 to a specific target. The second guidance kit 40 is also configured to operably engage with the first guidance kit 20, particularly with the first body 22 of first guidance kit 20, to enable guidance capabilities to the projectile 1. In one example, a second guidance kit described and illustrated herein may be a guidance kit having a seeker device. In another example, the guidance kit described and illustrated herein may be a preexisting or legacy guidance kit that includes commercially-available navigation equipment and/or instruments, including optical imaging devices, for guiding and steering a projectile to a desired target.

With respect to second guidance kit 40, second guidance kit 40 includes a second body 42 that operably engages with the first body 22 of the first guidance kit 20 and houses the electrical components and/or device of second guidance kit 40. The second body 42 includes a first or front end 42A positioned away from the first body 22, a second end 42B opposite to the first end 42A and operably engages with the first body 22 at the first end 22A of the first body 22, and a longitudinal axis 42C defined therebetween. In the present disclosure, the first end 42A is the foremost point of the projectile 1.

The second body 42 also includes a cylindrical wall 42D that extends between the first end 42A and the second end 42B. The cylindrical wall 42D of the second body 42 may also be configured to house devices and components of the second guidance kit 40 and other guidance devices discussed in greater detail below. The cylindrical wall 42D of the second body 42 may also define an exterior surface 42E that extends longitudinally between the first end 42A and the second end 42B and faces the exterior environment surrounding the projectile 1. The cylindrical wall 42D also defines an interior surface 42F that extends longitudinally between the first end 42A and the second end 42B and faces into the second body 42 in an opposite direction relative to the exterior surface 42E.

The second body 42 also defines a chamber 42G inside of the cylindrical wall 42D between the first end 42A and the second end 42B. The chamber 42G is also accessible at a fore or front opening 42H defined at the first end 42A of the second body 42. The chamber 42G is also accessible at an aft or rear opening 42J defined at the second end 42B of the second body 42. Such devices and components of the second guidance kit 40 may be inserted through the rear opening 42J for storing and/or housing said devices and components of the second guidance kit 40 inside of chamber 42G.

Figure 3:
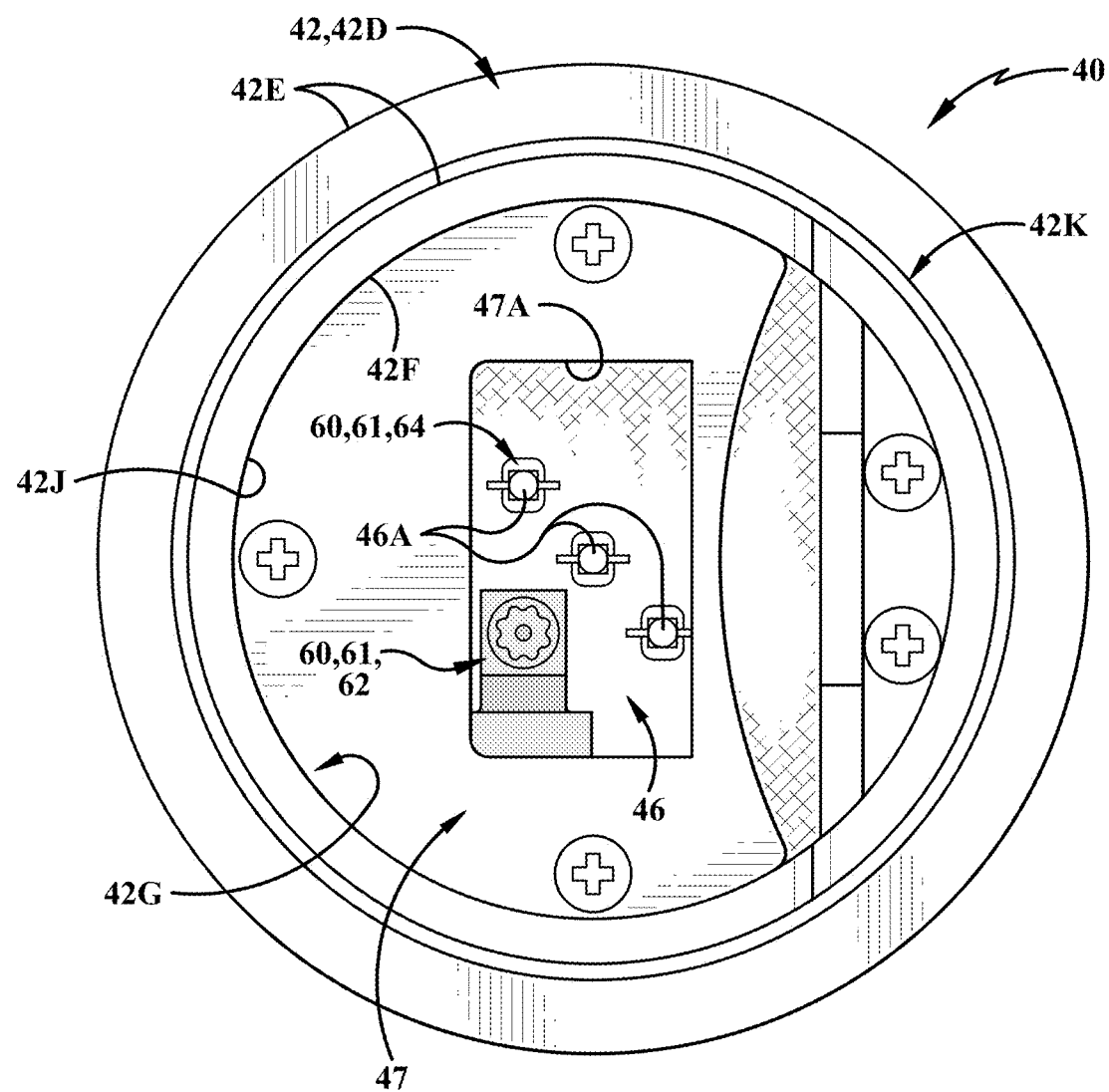
FIG. 3 is a rear elevation view of the second guidance kit taken in the direction of line 3-3 shown in FIG. 2.

The second body 42 may also define external threading 42K. As best seen in FIGS. 2 and 3, the external threading 42K may extend along a portion of the exterior surface 42E from the second end 42B of the second body 42 towards a position that is between the first end 42A and the second end 42B. Upon assembly of projectile 1, the external threading 42K is complementary with the internal threads 22J of the first body 22 such that the first body 22 and the second body 42 are threadably engagable with one another.

The second guidance kit 40 may also include fore optical imaging device or seeker device 44. As best seen in FIG. 1, the seeker device 44 operably engages with the interior surface 42F of the cylindrical wall 42D of the second body 42 inside of the chamber 42G. In the present disclosure, a portion of the seeker device 44 extends through the front opening 42H of the second body 42 to visibly view the external environment and/or far field forward of the projectile 1. During operation, the seeker device 44 is configured to visualize and detect one or more electromagnetic wavelengths (e.g., visible light or visible spectrum wavelengths, infrared wavelengths, ultraviolet wavelengths, etc.) of desired targets, particularly aircrafts and air vehicles in flight. In one instance, a seeker device mentioned herein may be an electro-optical/infrared-red ("EOIR") device for visualizing and detecting infrared wavelengths of heat sources or signatures of desired targets, particularly engines or engine exhaust plumes of aircrafts and air vehicles. It should be understood that seeker device 44 is configured to detect and capture one or more electromagnetic wavelengths of at least one desired target to show the orientation of the at least one desired target during flight.

Second guidance kit 40 also includes a second guidance direction generally referred to as 45. As best seen in FIGS. 5 and 7, and similar to the first guidance direction 27, the second guidance direction 45 is denoted by a pair of arrows extending outwardly from the longitudinal axis 42C of the second body 42. In the present disclosure, the second guidance direction 45 is also provided at a second orientation or angular position relative to the longitudinal axis 42C of the second body 42. In the present disclosure, the first guidance direction 27 of the first guidance kit 20 and the second guidance direction 45 of the second guidance kit 40 are offset from one another and/or angularly displaced with one another; such angular offset is denoted by arrows labeled "a" in FIG. 5. Stated differently, the first guidance direction 27 of the first guidance kit 20 and the second guidance direction 45 of the second guidance kit 40 fail to be aligned in the same direction due to first body 22 and the second body 42 being disposed at different axial positions relative to longitudinal axes 22C, 42C. It should be understood that the second guidance direction 45 represents the directional guidance of the second guidance kit 40 for guiding the projectile 1 to a desired target and/or location based on the data and information detected and/or viewed by the seeker device 44.

Second guidance kit 40 also includes a second two-way communication board 46. As best seen in FIG. 3, the second two-way communication board 46 is housed inside of the chamber 42G of the second body 42 and is accessible at the rear opening 42J. The second two-way communication board 46 may also include a set of sensors or communication lights 46A that electrically connect with and operably engaged with the second two-way communication board 46 for communicating with the first guidance kit 20. Particularly, the communication lights 46A provided with the second two-way communication board 46 may communicate with set of communication lights 28A of the first two-way communication board 28 of the first guidance kit 20 for relaying and/or communicating guidance information to the first guidance kit 20 when the projectile 1 is powered to an operating state and is in flight.

Second guidance kit 40 also includes a cover or shielding 47. As best seen in FIG. 3, the cover 47 operably engages with the second body 42 by a set of attachment members (e.g., connectors, fasteners, and other suitable attachment members of the like). The cover 47 may also pivot inside of the second body 42 by a hinge assembly. Still referring to FIG. 3, cover 47 defines an opening 47A that extends entirely through the cover 47 such that front and rear surfaces of the cover 47 are in communication with one another at the opening 47A. Such use and purpose of the opening 47A is discussed in greater detail below.

Projectile 1 also includes a calibration assembly 60 that operably engages with the first guidance kit 20 and the second guidance kit 40. In the present disclosure, the calibration assembly 60 is configured to calibrate a guidance direction of one of the guidance kits mentioned herein with another guidance direction of the other guidance kit mentioned herein. In the present disclosure, the calibration assembly 60 is configured to calibrate the second guidance direction 45 of the second guidance kit 40 with the first guidance direction 27 of the first guidance kit 20 such that the second guidance direction 45 and the first guidance direction 27 are aligned in the same guidance direction (see FIG. 7). It should be noted that the calibration operation performed by the calibration assembly 60 removes the need of operators or technicians of these projectiles 1 from rearranging and/or reconfiguring the first guidance kit 20 and the second guidance kit 40 to align the second guidance direction 45 and the first guidance direction 27 in the same guidance direction. Such components and devices of the calibration assembly 60 are now described in greater detail below.

Figure 6:
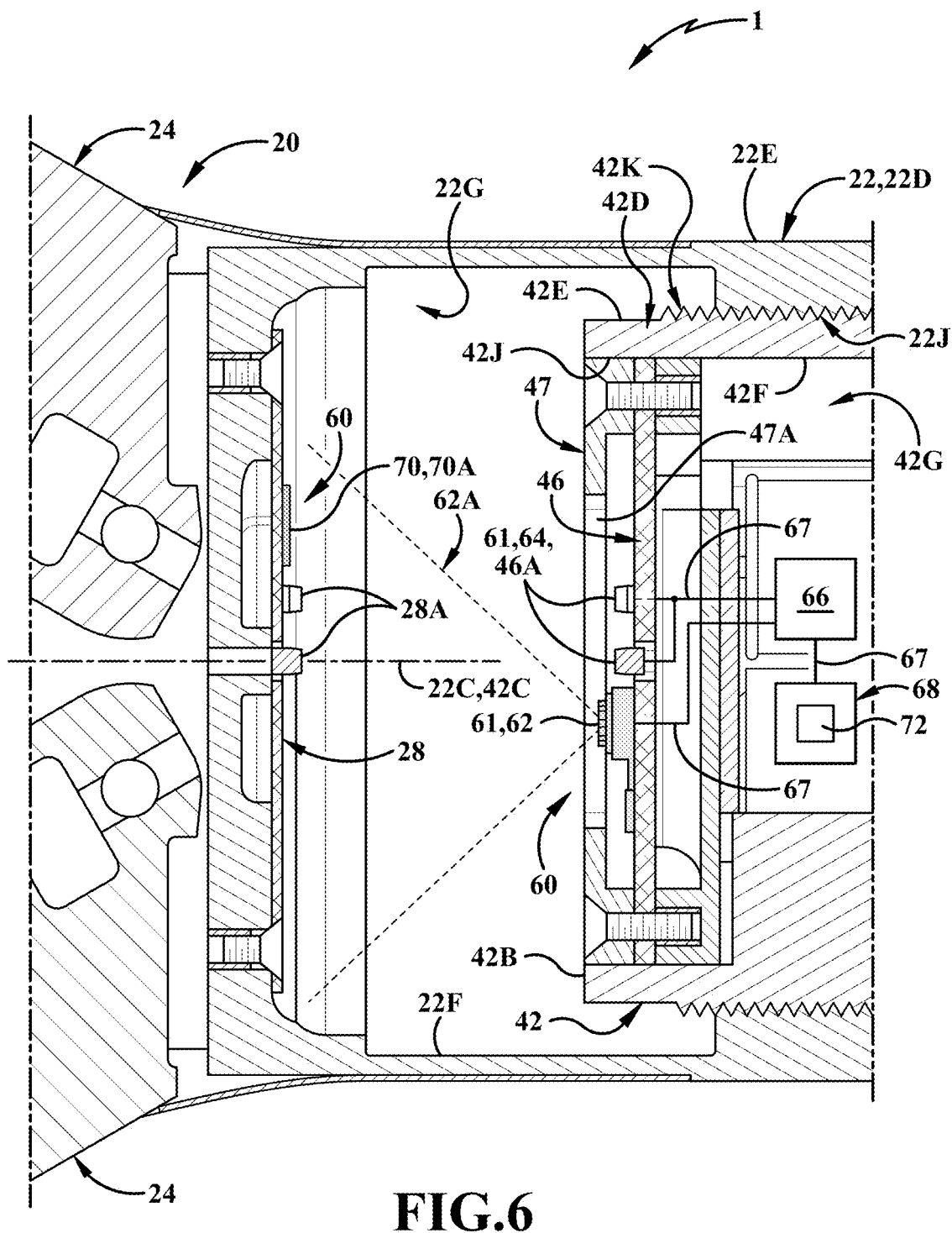
FIG. 6 is another operational view similar to FIG. 5 taken in the direction of line 6-6 shown in FIG. 5, but an imaging device of the calibration assembly is instructed to capture at least one image of an orientation marker of the calibration assembly.

The calibration assembly 60 includes at least one imaging device 62 of an imaging assembly 61. As best seen in FIGS. 3 and 6, the at least one imaging device 62 operably engages with and is in electrical communication with the second two-way communication board 46 of second guidance kit 40. In the present disclosure, the at least one imaging device 62 is housed inside of the second body 42 of the second guidance kit 40. Referring to FIG. 6, the at least one imaging device 62 is directed at and/or faces the first two-way communication board 28 of the first guidance kit 20 for calibration purposes, which are discussed in greater detail below. The at least one imaging device 62 also has a field of view (denoted by a dashed-line triangle labeled 62A) that is capable of viewing the entire first two-way communication board 28 of the first guidance kit 20 for calibration purposes, which are discussed in greater detail below. The at least one imaging device 62 also has the field of view that is capable of viewing a portion of an orientation marker (discussed in greater detail below) and the set of communication lights 28A as it may not be necessary to view the entire first two-way communication board 28.

It should be understood that any suitable number of imaging devices may be included in a calibration assembly discussed herein. In the present disclosure, calibration assembly 60 includes a single imaging device 62 that is capable of viewing the entire first two-way communication board 28 of the first guidance kit 20 for calibration purposes, or a portion of an orientation marker (discussed in greater detail below) and the set of communication lights 28A as it may not be necessary to view the entire first two-way communication board 28. It should also be understood that any suitable imaging device may be used in a calibration assembly discussed herein that is capable of viewing the entire first two-way communication board of a first guidance kit for calibration purposes. In the present disclosure, imaging device 62 is a visible camera equipped with macro lens that is capable of viewing the entire the first two-way communication board 28 of the first guidance kit 20 for calibration purposes.

Calibration assembly 60 also includes at least one illumination device 64 of the imaging assembly 61. As best seen in FIGS. 3 and 6, the at least one illumination device 64 operably engages with and is in electrical communication with the second two-way communication board 46 of second guidance kit 40. In the present disclosure, the at least one illumination device 64 is housed inside of the second body 42 of the second guidance kit 40. Still referring to FIGS. 3 and 6, the at least one illumination device 64 is also directed at and/or faces the first two-way communication board 28 of the first guidance kit 20 for calibration purposes, which are discussed in greater detail below. When commanded and/or instructed by a controller of calibration assembly 60, the at least one illumination device 64 is capable of illuminating a portion of or the entire first two-way communication board 28 of the first guidance kit 20 for calibration purposes, which are discussed in greater detail below.

It should be understood that any suitable number of illumination devices may be included in a calibration assembly discussed herein. In the present disclosure, calibration assembly 60 includes a single illumination device 64 that is capable of illuminating a portion of or the entire first two-way communication board of a first guidance kit for calibration purposes. In the present disclosure, the illumination device 64 is one of the communication lights 46A of the second guidance kit 40. It should also be understood that any suitable imaging device may be used in a calibration assembly discussed herein that is capable of illuminating a portion of or the entire first two-way communication board of a first guidance kit for calibration purposes. In the present disclosure, the illumination device 64 is a light emitting diode (LED) or similar light source that is capable of illuminating a portion of or the entire first two-way communication board 28 of the first guidance kit 20 for calibration purposes.

Calibration assembly 60 also includes at least one processor 66 of the imaging assembly 61. In the present disclosure, a single processor 66 is illustrated herein for schematic and diagrammatic purposes. In other exemplary embodiments, any suitable number of processors may be provided with a projectile for a specific military operation (e.g., guidance protocols and methods). Processor 66 is configured to logically perform programs and/or methods that the processor 66 has access to prior to military operation, including calibration programs and/or products that are discussed in greater detail below. The processor 66 may also be powered by an on-board power source and/or power supply (e.g., portable battery, etc.) in order to logically perform programs and/or methods that are operatively in communication with the processor 66. The processor 66 may also be in logical communication with a tangible medium, such as a non-transitory computer readable medium, for executing conventional guidance applications or protocols and/or novel guidance applications or protocols discussed herein.

In the present disclosure, the processor 66 is operatively connected with the imaging device 62 and the illumination device 64 via an electrical connection 67 that may be a wired connection, a wireless connection, or other similar electrical connections of the like. With such electrical connection, the processor 66 is electrically connected with the imaging device 62 and the illumination device 64 to command and/or instruct operation of the imaging device 62 and the illumination device 64 for calibration purposes. The processor 66 may also receive one or more images from the imaging device 62 upon commanding and/or instructing the imaging device 62 to capture at least one image. As discussed in greater detail below, processor 66 utilizes the one or more images captured by the imaging device 62 in combination with a calibration program of calibration assembly 60 to provide calibration parameters and/or setting to the second guidance kit 40 for adjusting and aligning the second guidance direction 45 with the first guidance direction 27 of the first guidance kit 20.

Calibration assembly 60 includes at least one non-transitory computer readable medium 68. In the present disclosure, a single computer readable medium 68 is illustrated herein for schematic and diagrammatic purposes. In other exemplary embodiments, any suitable number of computer readable media may be provided with a projectile for specific a military operation (e.g., guidance programs and methods). Computer readable medium 68 is configured to logically store programs and/or methods that the processor 66 has access to prior to military operation, including calibration programs and products discussed herein. Computer readable medium 68 may also be powered by an on-board power source and/or power supply (e.g., portable battery, etc.) in order to be operatively in communication with the processor 66.

In the present disclosure, the computer readable medium 68 is operatively connected with the processor 66 via an electrical connection 67 such as wire or other similar electrical connection of the like. With such electrical connection, the processor 66 and the computer readable medium 68 are enabled to communicate with one another during a calibration operation. As discussed in greater detail below, processor 66 may access and execute a calibration program stored in the computer readable medium 68 to provide calibration parameters and/or setting to the second guidance kit 40 for adjusting and aligning the second guidance direction 45 with the first guidance direction 27 of the first guidance kit 20.

Calibration assembly 60 also includes an orientation marker 70. As best seen in FIGS. 4 and 6, the orientation marker 70 operably engages with the first guidance kit 20, particularly with the first two-way communication board 28, inside of the first body 22. In the present disclosure, the orientation marker 70 faces at the imaging device 62 and the illumination device 64 when engaged with the first two-way communication board 28. It should be understood that the orientation marker 70 may be engaged with the communication board 28 in any suitable manner that maintains the orientation marker 70 with the communication board 28 and faces at the imaging device 62 and the illumination device 64. In one exemplary embodiment, the orientation marker 70 is affixed and/or adhered to a portion of the communication board 28.

Still referring to orientation marker 70, orientation marker 70 defines an irregular and/or asymmetrical shape or profile. Such asymmetrical shape of the orientation marker 70 provides an orientation indicator to the processor 66 to determine and calibrate the second guidance direction 45 with the first guidance direction 27 based on an angular displacement between a zeroed or base position of the orientation marker 70 (i.e., the direction of the first guidance direction 27) and a translated position of the orientation marker 70 (i.e., the offset direction of the first guidance direction 27) captured by the imaging device 62.

Still referring to orientation marker 70, orientation marker 70 may also include a computer readable medium 70A. As best seen in FIG. 4, the computer readable medium 70A faces at the imaging device 62 and the illumination device 64. The computer readable medium 70A may be accessible and executable by the processor 66 once the processor 66 receives at least one image captured and outputted by the imaging device 62. The computer readable medium 70A may store data and information relating to devices, components, or equipment provided in projectile 1, including data and information pertaining to the first guidance kit 20 (e.g., model and/or generation of the kit, software and/or firmware of the kit, and other relevant data). In the present disclosure, the computer readable medium 70A of orientation marker 70 is a quick-response code (or QR code) that stores data and information relating to devices, components, or equipment provided in projectile 1, including data and information pertaining to the first guidance kit 20. In other exemplary embodiments, any commercially-available computer readable medium may be provided with orientation marker discussed herein to store data and information relating to devices, components, or equipment provided in a projectile. Some other examples of a medium 70A could include other image codes (e.g., QR Code Micro, Quick Response Matrix (QRM), Data Matrix, Aztec Code, PDF417) that include orientation markers. These markers can be designed as specific patterns or elements within the code that help in determining orientation.

Still referring to orientation marker 70, in one example, orientation marker 70 is also a non-powered device that includes a retro-reflective material. Such configuration of the orientation marker 70 enables light from the imaging device 62 and/or illumination device 64 to be reflected off of the orientation marker 70. In one exemplary embodiment, orientation marker may also be a powered device that illuminates via an electrical source, mechanical source, or chemical source so that imaging device 62 may capture the orientation of the orientation marker 70 during calibration operations. In another exemplary embodiment, the illumination device 64 may also be provided and/or engaged with the first two-way communication board 28 that is housed inside of the chamber 22G of the first body 22 to illuminate the orientation marker 70 from inside of the chamber 22G. In this exemplary embodiment, the orientation marker 70 may be transparent or translucent so that light emitted by the illumination device 64 may act as a backlight and shine through the orientation marker 70 to illuminate the orientation marker 70 when commanded by the processor 66.

Figure 8:
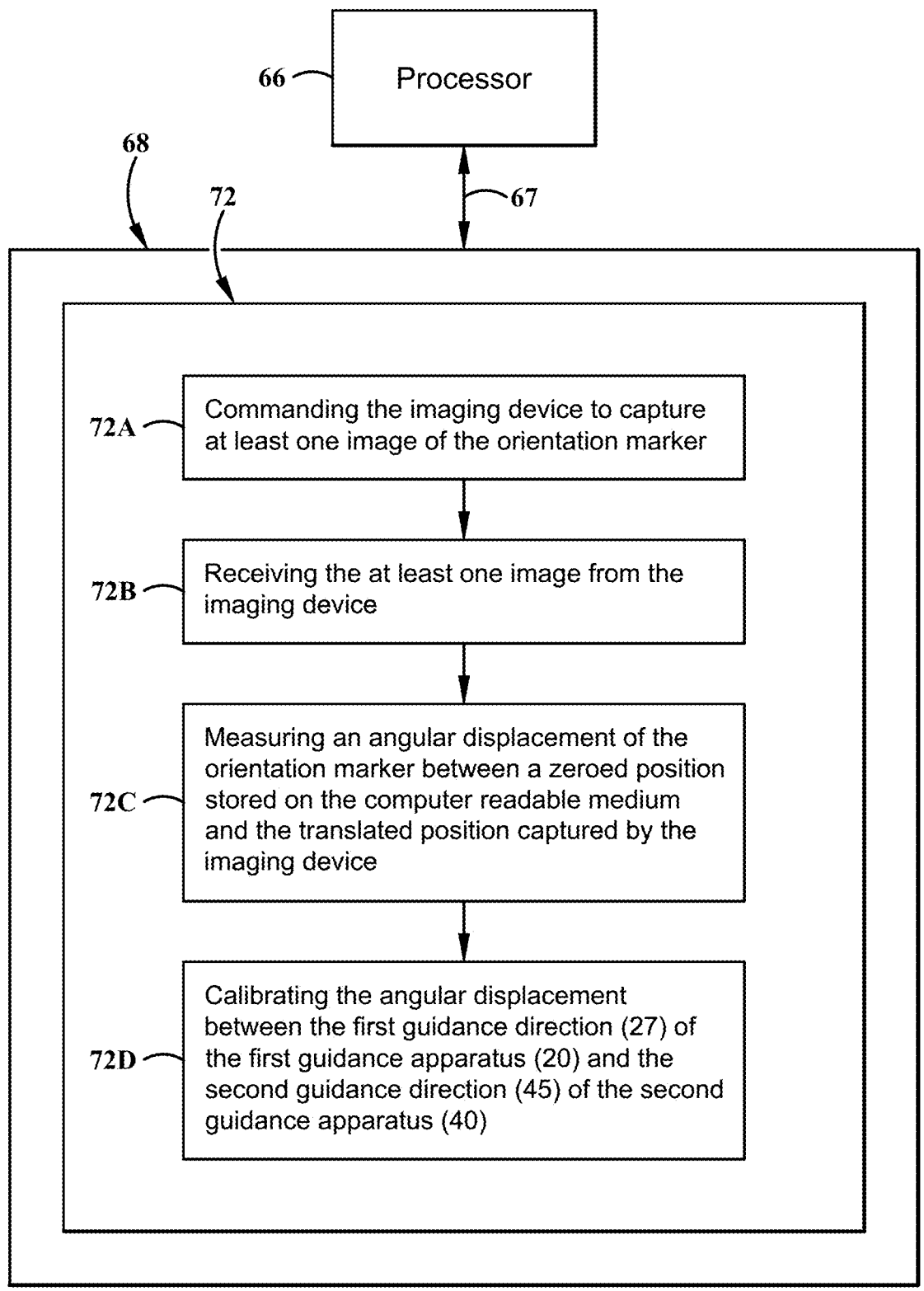
FIG. 8 is a diagrammatic flowchart of a calibration program of the calibration assembly stored on a non-transitory computer readable medium and executable by a processor of the calibration assembly.

Calibration assembly 60 may also include a computer-implemented product and/or computer program product 72 (hereinafter "calibration program 72"). As best seen in FIG. 8, the calibration program 72 is in logical communication with processor 66. In the present disclosure, calibration program 72 may be loaded into a tangible medium, such as computer readable medium 68, that is in logical communication with the processor 66 for executing and running the calibration program 72 during a calibration operation. As discussed in greater detail below, calibration program 72 causes the processor 66, when executed by the processor 66, to calibrate the second guidance kit 40 with the first guidance kit 20 such that the second guidance direction 45 is calibrated to and aligned with the first guidance direction 27 for guidance operations. Such steps of the calibration program 72 are discussed in greater detail below.

Calibration program 72 includes an initial or first step 72A that, upon execution by the processor 66, commands the imaging device 62 to capture at least one image of the orientation marker 70, wherein the orientation marker 70 is provided at a translated position (see FIG. 6). Here, the processor 66 would be initiated to an operating state and would be configured to access and execute the calibration program 72. In operation, the processor 66 would output a command or instruction to the imaging device 62 to capture at least one image of the orientation marker 70 at the translated position. Optionally, the processor 66 may also output more than one command or instruction to the illumination device 64 to illuminate the orientation marker 70 when the imaging device 62 is capturing at least one image of the orientation marker 70. It should be understood that prior to first step 72A, the first guidance kit 20 and the second guidance kit 40 would be threadably engaged with one another where the first guidance direction 27 and the second guidance direction 45 would be rotationally displaced from one another (see FIG. 5); such actions of threadably engaging the second guidance kit 40 with the first guidance kit 20 is denoted by an arrow labeled "E" in FIG. 5.

Calibration program 72 also includes a second step 72B, that, upon execution by the processor 66, processor 66 receives the at least one image from the imaging device 62. Optionally, the processor 66 may output more than one command or instruction to the imaging device 62 to capture more than one image of the orientation marker 70 at the translated position until processor 66 is able to recognize and view the orientation marker 70 once received by the processor 66. In this instance, first and second steps 72B may be repeated until the processor 66 is able to recognize and view the orientation marker 70 once received by the processor 66. Optionally, the processor 66 may also output more than one command or instruction to the illumination device 64 to illuminate the orientation marker 70 when the at least one image of the orientation marker 70 captured by the imaging device 62 is distorted and/or difficult to analyze due to the lack of light.

Calibration program 72 also includes a third step 72C, that, upon execution by the processor 66, processor 66 measures an angular displacement of the orientation marker 70 between a zeroed position stored on the computer readable medium 68 and the translated position. Based on the third step 72C, the computer readable medium 68 may be pre-programmed and/or pre-loaded with the zeroed position of the orientation marker 70 that indicates the predetermined location of the first guidance direction 27 of the first guidance kit 20. Once the processor 66 accesses and executes zeroed position of the orientation marker 70, the processor 66 may then perform an angular displacement analysis by simply measuring the translated position of the orientation marker 70 captured by the imaging device 62 with the zeroed position of the orientation marker 70 to determine the total angular displacement between the first guidance direction 27 and the second guidance direction 45.

Calibration program 72 also include a fourth step 72D, that, upon execution by the processor 66, processor 66 calibrates the angular displacement between the first guidance direction 27 of the first guidance apparatus 20 and the second guidance direction 45 of the second guidance apparatus 40. The processor 66 calculates such angular displacement based on the calculation made in the third step 72C. Once the angular displacement is found, the processor 66 may send such calibration data to the second guidance kit 40, particularly at least one controller or processor of the second guidance kit 40, so that the second guidance kit 40 may calibrate and adjust the second guidance direction 45 to the first guidance direction 27 that will remain fixed and/or static (see FIG. 7). Such calibration and/or adjustment made by the second guidance kit 40 based on calibration data accomplished by the processor 66 of calibration assembly 60 is denoted by an arrow labeled "C" in FIG. 7.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. It will be further understood that any connections between various components not explicitly described herein may be made through any suitable means including mechanical fasteners, or more permanent attachment means, such as bonded or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A calibration assembly for a guided vehicle, comprising:
   an orientation marker operably engaged with a first guidance apparatus of the guided vehicle;
   an imaging assembly operably engaged with and in electrical communication with a second guidance apparatus of the guided vehicle;
   wherein when the imaging assembly captures the orientation marker at a translated position for at least one cycle, the imaging assembly calibrates a rotational displacement between a first guidance direction of the first guidance apparatus and a second guidance direction of the second guidance apparatus based on an angular displacement of the orientation marker measured between a zeroed position denoting the first guidance direction and the translated position; and wherein the orientation marker comprises:
    a non-transitory computer readable medium facing at the imaging assembly and configured to store data about the first guidance apparatus.
2. The calibration assembly of claim 1, wherein the imaging assembly comprises:
    an imaging device operably engaged with the second guidance apparatus of the guided vehicle and faces the orientation marker;
    a processor operatively connected with the imaging device; and
    a calibration program executable by the processor, wherein the calibration program includes a zeroed position of the orientation marker;
    wherein when the imaging device captures the orientation marker at the translated position for the at least one cycle in response to the processor executing the calibration program, the processor calibrates the rotational displacement between the first guidance direction of the first guidance apparatus and the second guidance direction of the second guidance apparatus based on the angular displacement of the orientation marker measured between the zeroed position and the translated position.
3. The calibration assembly of claim 2, wherein the imaging assembly further comprises:
    at least one illumination device operably engaged with the processor and facing towards the orientation marker;
    wherein the at least one illumination device is configured to illuminate at least a portion of the orientation marker prior to the imaging device viewing the orientation marker.
4. The calibration assembly of claim 2, wherein the orientation marker comprises:
    a geometric shape of the orientation marker denoting the first guidance direction at the zeroed position;
    wherein the calibration assembly is configured to calibrate the second guidance apparatus with the first guidance apparatus based on the angular displacement between a second geometric shape of the translated position and the geometric shape of the zeroed position.
5. The calibration assembly of claim 2, further comprising:
    at least one illumination device operably engaged with the orientation marker and facing towards the imaging device;
    wherein the at least one illumination device is configured to illuminate the orientation marker from the first guidance apparatus and remote from the imaging device.
6. The calibration assembly of claim 1, wherein the orientation marker is made of a retro-reflective material.
7. The calibration assembly of claim 2, wherein the imaging device is a visible light camera equipped with a macro lens.
8. A method, comprising:
    installing an orientation marker with a first guidance apparatus of a guidance kit, wherein the first guidance apparatus defines a first guidance direction;
    installing an imaging assembly with a second guidance apparatus of the guidance kit, wherein the second guidance apparatus defines a second guidance direction independent of the first guidance direction;
    wherein the orientation marker comprises:
        a non-transitory computer readable medium facing at the imaging assembly and configured to store data about the first guidance apparatus;
    loading a computer program product for calibration of the guidance kit on a non-transitory computer readable medium of the imaging assembly that is executable by a processor of the imaging assembly which, when executed by the processor, causes the processor to:
    command an imaging device of the imaging assembly to analyze at least one image of the orientation marker, wherein the orientation marker is provided at a translated position;
    receive the at least one image from the imaging device;
    measure an angular displacement of the orientation marker between a zeroed position stored on the computer readable medium and the translated position; and
    calibrate a rotational displacement between the first guidance direction of the first guidance apparatus and the second guidance direction of the second guidance apparatus.
9. The method of claim 8, wherein when the computer program product is executed by the processor, the processor is further caused to:
    command an illumination device of the imaging assembly to illuminate at least a portion of the orientation marker prior to the imaging device capturing the at least one image of the orientation marker.
10. The method of claim 8, further comprising:
    installing a non-transitory computer readable medium on the orientation marker to store data about the first guidance apparatus; and
    wherein when the non-transitory computer program product is executed by the processor, the processor is further caused to:
    analyze the data stored in the non-transitory computer readable medium to acquire knowledge of the first guidance apparatus.
11. The method of claim 8, wherein the orientation marker is formed of retro-reflective material.
12. The method of claim 8, wherein when the computer program product is executed by the processor, the processor is further caused to:
    command an illumination device to illuminate the orientation marker from the first guidance apparatus prior to the imaging device capturing the at least one image of the orientation marker.
13. The method of claim 8, wherein the imaging device is a visible light camera equipped with macro lens.
14. A computer-implemented method stored on a non-transitory computer readable medium of a calibration assembly and executable by a processor of the calibration assembly on a guided vehicle, the computer-implemented method comprising:
    executing, by the processor, a first instruction to command an imaging device of the calibration assembly to capture at least one image of an orientation marker, wherein the orientation marker comprises a non-transitory computer readable medium facing the imaging assembly and configured to store data about a first guidance apparatus of the guided vehicle, wherein the orientation marker is provided at a translated position;
    executing, by the processor, a second instruction to receive the at least one image from the imaging device;
    executing, by the processor, a third instruction to measure an angular displacement of the orientation marker between a zeroed position stored on the non-transitory computer readable medium and the translated position; and
    executing, by the processor, a fourth instruction to calibrate a rotational displacement between a first guidance direction of the first guidance apparatus and a second guidance direction of a second guidance apparatus.

15. The computer-implemented method of claim 14, further comprising:
executing, by the processor, a fifth instruction to command an illumination device of the calibration assembly to illuminate at least a portion of the orientation marker prior to the imaging device capturing the at least one image of the orientation marker.

16. The computer-implemented method of claim 14, further comprising:
executing, by the processor, a fifth instruction to analyze data stored in a non-transitory computer readable medium of the orientation marker about the first guidance apparatus.

17. The computer-implemented method of claim 14, wherein the second instruction of receiving the at least one image from the imaging device further includes that the orientation marker reflects light emitted by the imaging device back to the imaging device based on the orientation marker being formed of a retro-reflective material.

\* \* \* \* \*